United States Patent
Sharma et al.

(10) Patent No.: US 10,855,816 B2
(45) Date of Patent: Dec. 1, 2020

(54) HIGHLY PARALLEL PROGRAMMABLE PACKET EDITING ENGINE WITH A SCALABLE CONTROL INFRASTRUCTURE

(71) Applicant: Avago Technologies International Sales Pte. Limited, Singapore (SG)

(72) Inventors: Rajan Sharma, San Jose, CA (US); Niranjan Vaidya, San Jose, CA (US); Mandar Joshi, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 6 days.

(21) Appl. No.: 16/418,869

(22) Filed: May 21, 2019

(65) Prior Publication Data
US 2019/0379767 A1 Dec. 12, 2019

Related U.S. Application Data

(60) Provisional application No. 62/682,454, filed on Jun. 8, 2018, provisional application No. 62/682,701, filed on Jun. 8, 2018.

(51) Int. Cl.
*H04L 29/06* (2006.01)
*H04L 12/947* (2013.01)
*H04L 12/879* (2013.01)

(52) U.S. Cl.
CPC .............. *H04L 69/08* (2013.01); *H04L 49/25* (2013.01); *H04L 49/9026* (2013.01); *H04L 69/22* (2013.01)

(58) Field of Classification Search
CPC ....... H04L 69/08; H04L 69/22; H04L 49/309; H04L 49/25; H04L 49/9026
See application file for complete search history.

*Primary Examiner* — Kevin C. Harper
*Assistant Examiner* — Henry Baron
(74) *Attorney, Agent, or Firm* — Morgan, Lewis & Bockius LLP

(57) ABSTRACT

A highly parallel programmable packet editing engine with a scalable control infrastructure includes receiving an ingress packet having one or more headers; assigning, by one or more processors, the one or more headers of the ingress packet to a number of zones, wherein each zone is a grouping of adjacent headers that are closely related to one another by information content or processing type; performing, by the one or more processors, offset computations for the one or more headers in a zone concurrently with offset computations of headers assigned to other zones; performing, by the one or more processors, different header operations on the one or more headers concurrently with respective ones of a plurality of editing engines; combining, by the one or more processors, the edited one or more headers at the computed offsets to generate a modified egress packet; and providing, for transmission, the modified egress packet.

34 Claims, 8 Drawing Sheets

HIGHLY PARALLEL PROGRAMMABLE PACKET EDITING ENGINE WITH A SCALABLE CONTROL INFRASTRUCTURE

CROSS REFERENCE TO RELATED APPLICATIONS

The present application claims the benefit of U.S. Provisional Application No. 62/682,454, titled "SCALABLE CONTROL INFRASTRUCTURE FOR A HIGHLY PARALLEL PACKET REWRITE ENGINE," filed on Jun. 8, 2018, and U.S. Provisional Application No. 62/682,701, titled "PROGRAMMABLE, LOW LATENCY PACKET EDITING," filed on Jun. 8, 2018, the contents of which are incorporated herein by reference in their entirety for all purposes.

TECHNICAL FIELD

The present disclosure relates generally to a network device for processing data, and in particular, to a highly parallel programmable packet editing engine with a scalable control infrastructure.

BACKGROUND

Networking infrastructures are facing ever increasing demands for increased bandwidth and intelligent services for a rapidly growing number of users. Efficient power consumption is also of concern. Network switch devices that handle these user interactions, such as switches and routers, spend significant processing time performing lookups and accessing memories for every packet that is processed. For example, each packet may follow a process where 1) the packets ingress into the switch device; 2) various parameters of the packet are parsed; 3) classification is performed using tables, registers and/or fields to derive forwarding information; and 4) packet modification actions are derived, such as packet forward or drop action. As network traffic through the switch device increases, the packet processing overhead correspondingly increases. Additional processors and memory may be added to handle the increased demands, but may add cost to the switch device and may also consume real estate and power.

BRIEF DESCRIPTION OF THE DRAWINGS

Certain features of the subject technology are set forth in the appended claims. However, for purpose of explanation, several embodiments of the subject technology are set forth in the following figures.

Certain features of the subject technology are set forth in the appended claims. However, for purpose of explanation, one or more implementations of the subject technology are set forth in the following figures.

DETAILED DESCRIPTION

Figure 1:
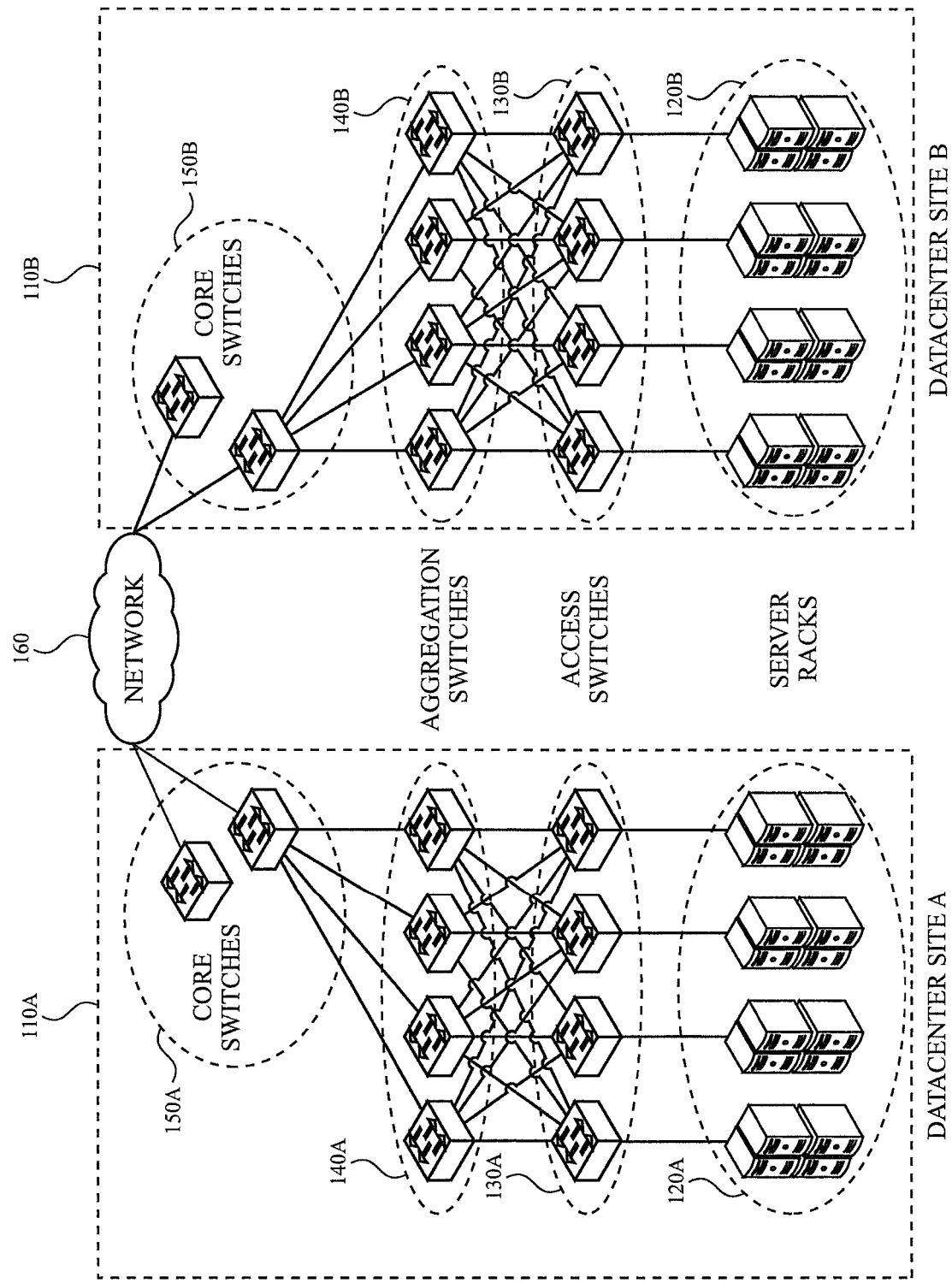
FIG. 1 illustrates an example network environment in which a network device may be implemented in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In packet switched networks, a packet consists of a "data unit" preceded by a stack of headers. In some aspects, trailing headers may also be added to the end of the data unit. All network devices need to operate on these packet headers. The network device may perform editor operations, such as ADD, DELETE or MODIFY individual headers. These editor operations are performed by a packet or header editor in the network device. If a network device needs to manipulate multiple headers, the editor operations can become complicated. Existing editor designs require a tradeoff between low latency and flexibility. If the editor operations are fixed and restricted, the editing latency is low. If the editor operations are flexible and user programmable, the editing latency is high. In high-performance network devices, such as switches and routers, the editor must ideally provide both operational flexibility and low latency.

The subject disclosure relates to a fully flexible packet header editing that achieves very low latency in the editing process. For example, the subject technology provides for an apparatus and method for packet editing that simultaneously enables 1) fully flexible and programmable packet editing, and 2) packet editing with significant low latency. Both characteristics (flexibility and low latency) are highly desirable in a network device that performs packet processing. Compared to prior header editing approaches, the subject technology includes a framework that enables many header operations to occur in parallel, whereas prior editing solutions used a serialized approach that leads to high latency.

Features of the subject technology described herein are applicable to any network device that is implemented to edit packet headers. In particular, the subject technology is particularly well suited for the design of network devices, such as high-performance network switches and routers, load balancers, security appliances (e.g., firewalls), network interface cards (NICs), etc. Applicable areas for the subject technology include, but are not limited to, mega-scale data center networks, software defined networks (SDNs), and high-performance computing. Key characteristics of these application areas include a single administrative entity for an entire network, fast evolution and uptake of network technologies, end user desire to create its own networking protocols and header formats, and low latency packet switching is highly desirable.

Furthermore, computing correct header offsets for a programmable low latency packet editor poses some inherent scalability challenges. As described herein, a programmable, low latency packet editor divides edit operations into zones. Each zone may include several possible incoming packet headers, where each unique combination of headers is encoded as a unique MATCH_ID value for a given zone. The editor may support several types of edit operations for a given zone, encoded with a respective EDIT_ID vector. These types of edit operations may include: 1) deletion of each possible header in a given zone, or a subset thereof, 2) rewrite of each possible header in a given zone, or a subset thereof, and 3) insertion of each possible header in a given zone, or a subset thereof. The offset computation for any given edit operation is dependent on a header that is being operated on, as well as the other headers in the zone. Networking standards define specific relative ordering requirements across various types of headers (e.g., header A should always occur before header B in the header stack, if the latter is present). Header offset computation in a programmable, low latency editor poses multiplicative scalability challenges as the number of headers in a zone increases.

The subject technology also provides for a framework that is scalable (hereinafter referred to as "M+E Scheme") for implementation of header offset computations in a low latency, programmable packet editor. The subject M+E scheme addresses two classes of scaling challenges: 1) multiplication of rules for possible incoming packet variations multiplied with the possible number of packet edits, and 2) the multiplication of rules for various types of edit operations for each header that is being operated upon. The scalability achieved by the M+E scheme includes: 1) separating information related to incoming packet headers and edit operations, and 2) encoding the information that allows simple post-processing logic to derive the necessary offset information.

FIG. 1 illustrates an example network environment 100 in which a highly parallel programmable packet editing engine with a scalable control infrastructure may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

Referring to FIG. 1, the network environment 100 includes datacenter site A 110A and datacenter center B 110B and a network 160. The datacenter sites 110A-B include server devices 120A-B, access switches 130A-B, aggregation switches 140A-B, core switches 150A-B in accordance with one or more implementations. Physical links are shown between the server devices 120A-B and access switches 130A-B respectively, and between the core switches 150A-B, the network 160, aggregation switches 140A-B, and access switches 130A-B. The relationship between the core switches 150A-B and aggregation switches 140A-B can be termed a hierarchical relationship, with the core switches 150A-B being superior. Similarly, the relationship between the aggregation switches 140A-B and access switches 130A-B can be hierarchical, where the aggregation switches 140A-B are superior.

The network environment 100 can be a subset of a data center network, and server devices 120A-B are configured to host applications and data for clients connected to the network 160. In some implementations, the teachings herein can apply to a variety of different network configurations and purposes.

The server devices 120A-B can be computer systems that have multiple processors and multiple shared or separate memory components such as, for example and without limitation, one or more computing devices incorporated in a clustered computing environment or server farm. The computing processes performed by the clustered computing environment or server farm, may be carried out across multiple processors located at the same or different locations. The server devices 120A-B can be implemented on a single computing device. Examples of computing devices include, but are not limited to, a device with a central processing unit, an application-specific integrated circuit, or other type of computing device having at least one processor and memory.

The network 160 can be any network or combination of networks, for example and without limitation, a local-area network, wide-area network, Internet, a wired connection (e.g., Ethernet) or a wireless connection (e.g., Wi-Fi, 3G, 4G, LTE) network that communicatively couples the networking components of FIG. 1 (e.g., the core switches 150A-B, the aggregation switches 140A-B, the access switches 130A-B, server devices 120A-B) to other networking components. In one or more aspects, the network 160 includes a cloud network topology.

The aggregation switches 140A-B and access switches 130A-B can be networking bridge devices with data ports that additionally have routing/switching capability, e.g., L2/L3 switch/router. The switches could have as little as two data ports or as many as 400 or more data ports, and can direct traffic in full duplex from any port to any other port, effectively making any port act as an input and any port as an output. Herein, data ports and their corresponding links can be interchangeably referred to as data channels, communication links, or data links, for ease of discussion. The aggregation switches 140A-B are configured to aggregate or truncate data gathered from one or more network nodes on the network 160. According to some implementations, the data operates on a deadline when traveling between the one or more network nodes and/or datacenter sites 110A-110B.

Because the physical depictions in the figures should not be interpreted as limiting, the access switches 130A-B and server devices 120A-B, as used herein can include server device 120A and access switch 130A combined in a single physical device (not shown). Access switches 130A-B also broadly include the use of switch logic in modern tiered switching architectures. The core switches 150A-B and aggregation switches 140A-B can be high speed switches that are placed in a network topology so as to link multiple access switches 130A-B. The term "physical," as used herein to describe network components, typically means "non-virtual," as in a non-virtualized device. Also, because the teachings herein as applied to traffic path selection and processing can be generally applied to all components that handle these functions, as used herein, the terms routing, switching and routing/switching are generally used interchangeably.

Figure 2:
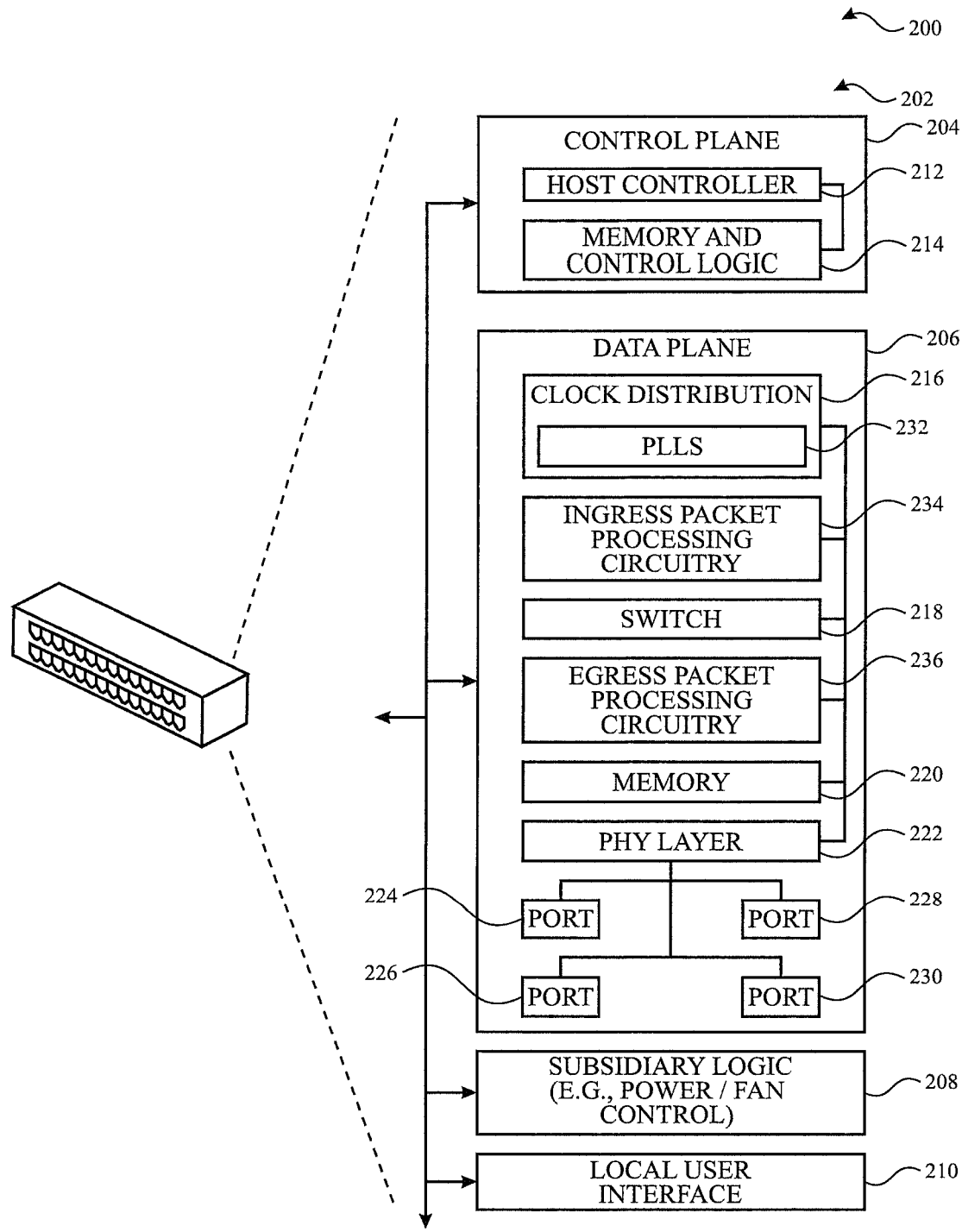
FIG. 2 illustrates a switch architecture of an example network device that may implement a highly parallel programmable packet editing engine with a scalable control infrastructure in accordance with one or more implementations.

FIG. 2 illustrates a switch architecture 200 of an example network device that may implement a highly parallel programmable packet editing engine with a scalable control infrastructure in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

According to some implementations, the switch architecture 200 is implemented as one of the access switches 130A-B as discussed in FIG. 1. Accordingly, the switch architecture 200 may connect to the network 160 including the aggregation switches 140A-B and core switches 150A-B as discussed in FIG. 1.

The switch architecture 200 generally includes system logic 202 divided into a control plane 204, a data plane 206, subsidiary logic 208, and a local user interface 210. The control plane 204 may include one or more host controllers 212 in communication with memory and control logic 214. In one example, the memory and control logic 214 may store instructions executed by the host controller 212 to implement overall control, configuration, and other desired functionality in the switch architecture 200.

The subsidiary logic 208 may control specific subsystems in the switch architecture 200. As examples, the subsidiary logic 208 may control fans, power supplies, or other systems. The local user interface 210 may accept configuration input and output via any indicator, display, annunciator, text based or graphical user interface.

The data plane 206 may include a clock distribution tree 216 for providing clock signals throughout the data plane 206, a switch fabric 218 for switching data packets, and data memory 220 for buffering packets and other data on ingress or egress. The switch fabric 218 may enable communication between the ingress packet processing circuitry 234 and the egress packet processing circuitry 236. In one or more implementations, the switch 218 includes a fabric, such as a mesh fabric, or any other interconnect that provides for communication between the ingress packet processing circuitry 234 and the egress packet processing circuitry 236. The data plane 206 may also include a Physical (PHY) layer 222 that transmits and receives packets through one or more ports (e.g., the Ethernet ports 224, 226, 228, and 230). The local user interface 210 may accept clock commands that the control plane 204 or data plane 206 processes to, for instance, set clock speeds for any clock domain within the switch architecture 200. Responsive to the clock commands, the control plane 204 or data plane 206 may set, e.g., inputs and parameters for phase locked loops (PLLs) 232, or any other clock generation logic, to change the speed of clocks delivered to ingress packet processing circuitry 234, egress packet processing circuitry 236, or both. In one or more implementations, the data plane 206 may include a serializer/deserializer (SerDes) interface running at line rate.

In the switch architecture 200, data, bits of data, a data packet, a set of data, signals, a frame (referred to as "data" or "data packet"), or a multicast frame (a frame that is intended to be transmitted to multiple destinations) may arrive at or be received at or through a physical port that may logically be referred to as an ingress port. Inbound data may be processed by the ingress packet processing circuitry 234 and therefore the ingress packet processing circuitry 234 may be referred to as being associated with one or more ingress ports (e.g., 224, 226). In one or more implementations, the data packets are large, and arrive and/or be processed in smaller pieces (referred to in one or more implementations as data "cells," "segments," "chunks," or "portions"). The data packet may depart from the switch architecture 200 at or through a physical port that may be logically referred to as an egress port. Outbound data may be processed by the egress packet processing circuitry 236, and therefore the egress packet processing circuitry 236 may be referred to as being associated with one or more egress ports (e.g., 228, 230). Thus, a physical port may be logically referred to as an ingress port when data is being received at or through the port, and the same physical port may also be logically referred to as an egress port when data is being transmitted at or through the port.

The ingress packet processing circuitry 234 and the egress packet processing circuitry 236 may include one or more dedicated memories or buffers and/or may include one or more packet processors. Since the ingress packet processing circuitry 234 and the egress packet processing circuitry 236 include dedicated memories, the switch architecture 200 may not be limited by memory throughput limitations, and therefore may be highly scalable and able to provide high bandwidth aggregation.

In operation, the ingress packet processing circuitry 234 may transmit data to the egress packet processing circuitry 236 or egress ports using various data transfer techniques or switching techniques, such as a store-and-forward data transfer technique and a cut-through data transfer technique, amongst others. In the store-and-forward data transfer technique, an ingress port associated with the ingress packet processing circuitry 234 may receive data segments of a data packet, such as data segments of a multicast frame. The ingress packet processing circuitry 234 may store the data segments in a memory or a buffer within the ingress packet processing circuitry 234 until the entire data packet has been received. Once the entire data packet has been received and stored in the memory of the ingress packet processing circuitry 234, the ingress packet processing circuitry 234 may forward the data packet to the egress packet processing circuitry 236. In the cut-through data transfer technique, an ingress port associated with the ingress packet processing circuitry 234 may receive data segments of a data packet, such as portions of a data packet. The ingress node 220 may transmit the portions of the data packet to the egress packet processing circuitry 236 without storing the data segments, or the entire data packet, in an internal buffer or memory of the ingress packet processing circuitry 234. The ingress packet processing circuitry 234 may replicate the portions of the data packet, as necessary, for transmission to the egress packet processing circuitry 236.

In one or more implementations, one or more of the control plane 204, the data plane 206, the subsidiary logic 208, the local user interface 210, the ingress packet processing circuitry 234, the switch 218, the egress packet processing circuitry 236, the PHY layer 222, or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

In a packet switched network, a source prepends every data packet with one or more headers. The headers describe attributes of the packet such as its source, its destination, and the quality of service desired. There can be multiple headers on a given packet carrying information for different layers in the network. Headers can be added, deleted, rewritten or left unchanged as the packet traverses from the source to the destination. The headers on a packet typically form a "stack." In some implementations, outer headers are processed before inner headers, but the ordering between inner and outer header processing may vary depending on implementation. In some examples, two packets with the same incoming header structure may experience different forwarding behaviors at a network device, such as a switch/router (e.g., the switch architecture 200), resulting in different outgoing headers. The header operations on a packet are a side effect of the processing steps in the network device.

Figure 3:
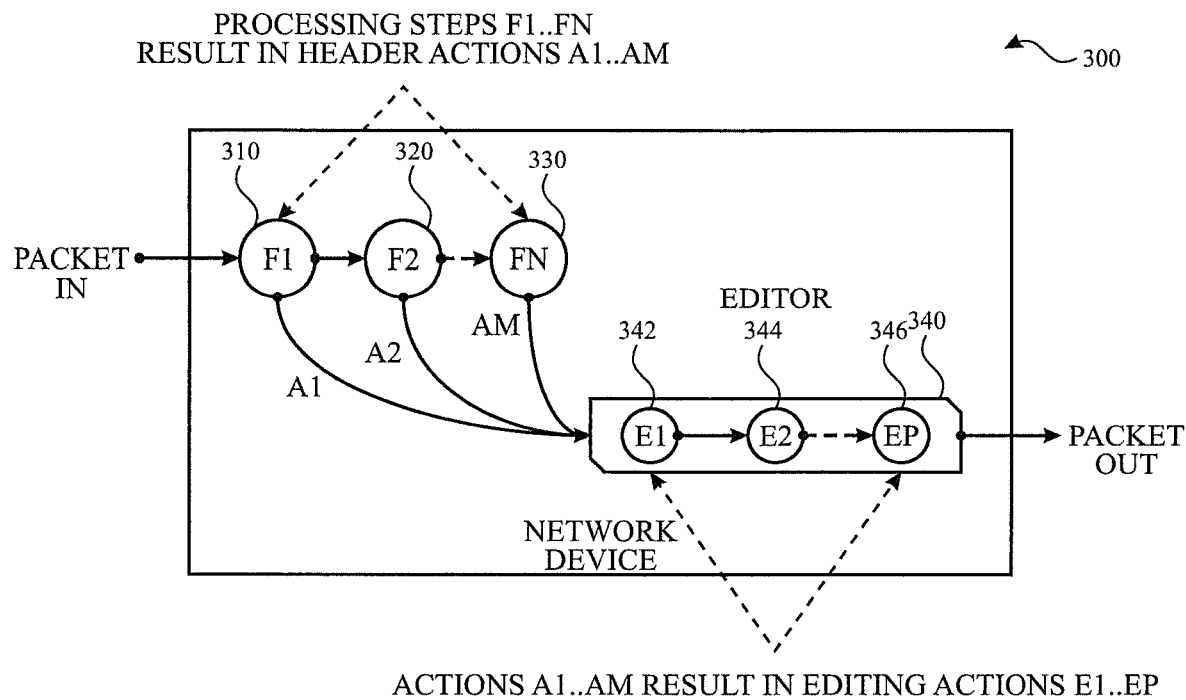
FIGS. 3 and 4 conceptually illustrate different approaches to processing headers in a network device.
Figure 4:
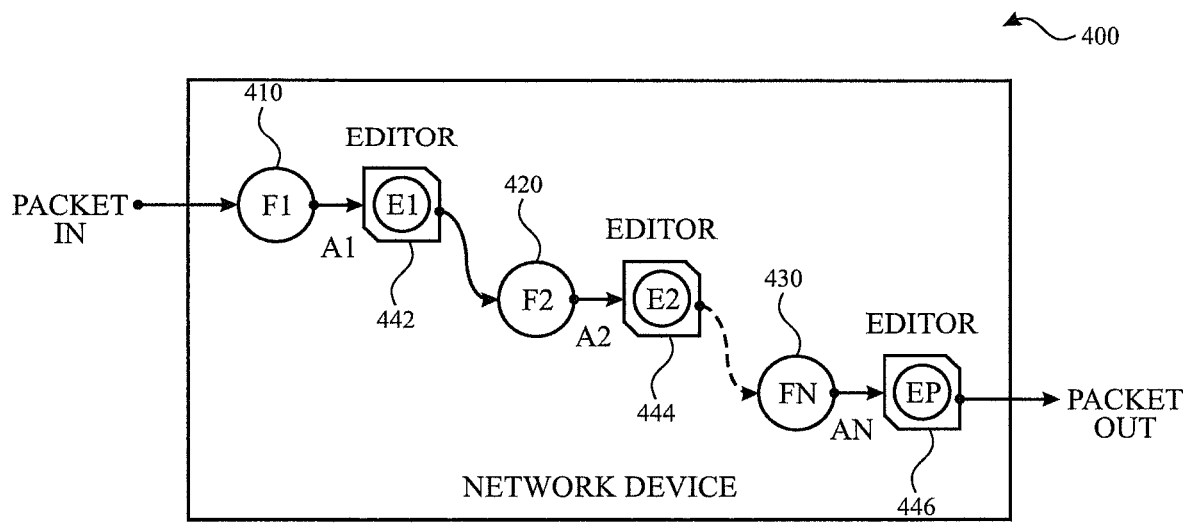

FIGS. 3 and 4 conceptually illustrate different approaches to processing headers in a network device. FIG. 3 shows a sequence 300 of processing steps {F1, F2, ... Fn} (e.g., 310, 320, 330, respectively) that result in actions {A1, A2, ... Am}. A subset of these actions will affect packet headers, however the effect is not determined till the end of all processing in the switch. Suppose actions {A1, A2, ... An} result in editing actions {E1, E2, ... Ep} (e.g., 342, 344, 346, respectively) performed by editor 340. These are applied sequentially at the end of the processing sequence. Each editing action Ei may result in the addition of one or more new header(s), deletion of one or more existing header(s) or modification of one or more preexisting header(s).

FIG. 4 shows a sequence 400 of processing steps {F1, F2, ... , Fn} (e.g., 410, 420, 430, respectively) that generate the same set of actions {A1, A2, ... Am}, but the edits are applied immediately after each editor operation. Suppose step F1 generates action A1, which results in edit operation E1 performed by editor 442. This is immediately applied to the packet. A subsequent step F2 sees the modified packet after F1, not the original packet. Each editing action Ei (e.g., 442, 444, 446, respectively) may result in the addition of one or more new header(s), deletion of one or more existing header(s) or modification of one or more preexisting header(s).

The approaches depicted in FIGS. 3 and 4 can produce equivalent results with appropriate state management. In some implementations, a hybrid implementation is possible, with certain actions applied immediately, and others aggregated and applied at the end. The sequence described in FIG. 3 is more common in integrated circuits, such as application-specific integrated circuits (ASICs) with programmable data planes, as it consolidates the costly header editing function.

Nevertheless, regardless of which approach is chosen in an implementation, the header operations are sequential. Edits due to operation Ei apply to the packet created after applying steps E1 ... Ei-1. This sequential editing process results in a large editing latency. When a complex set of headers are present on a packet and many headers need to be updated, this latency accumulates. If each editing action, such as Ei, can be flexibly programmed by a user, then each editing step is itself latency expensive.

In some aspects, there are two factors that force the packet header editing to be sequential: 1) the location of a header (e.g., denoted by a byte offset) within the packet is not known until previous header operations are completed and headers are added or deleted, and 2) outer headers may need to encode information identifying inner headers (e.g. the protocol field in the IPv4 header identifies the next header) and the inner header will not be known until other operations are completed.

To reduce this latency, implementations traditionally make various simplifying assumptions: a) an implementation may make limiting assumptions about the permutations of headers that can occur in a packet, in which the header offsets and sequence are thus easier to determine, and b) an implementation may make simplifying assumptions about the sequence of editing operations that can occur on a packet, for example, that header operations always follow a stack policy.

In many packet processing flows, headers are viewed as a stack, so the initial operations always result in the deleting of some headers due to protocol layer terminations. These are followed by forwarding actions that rewrite some headers. New headers are finally added on the way out of the switch.

The subject technology provides for a packet editor that offers: 1) fully user programmable editing operations on user defined notions of headers, 2) execution of these operations with low latency, and 3) while making no limiting assumptions about, the sequence of headers present on a packet or the sequence of operations taking place on the headers.

Figure 5:
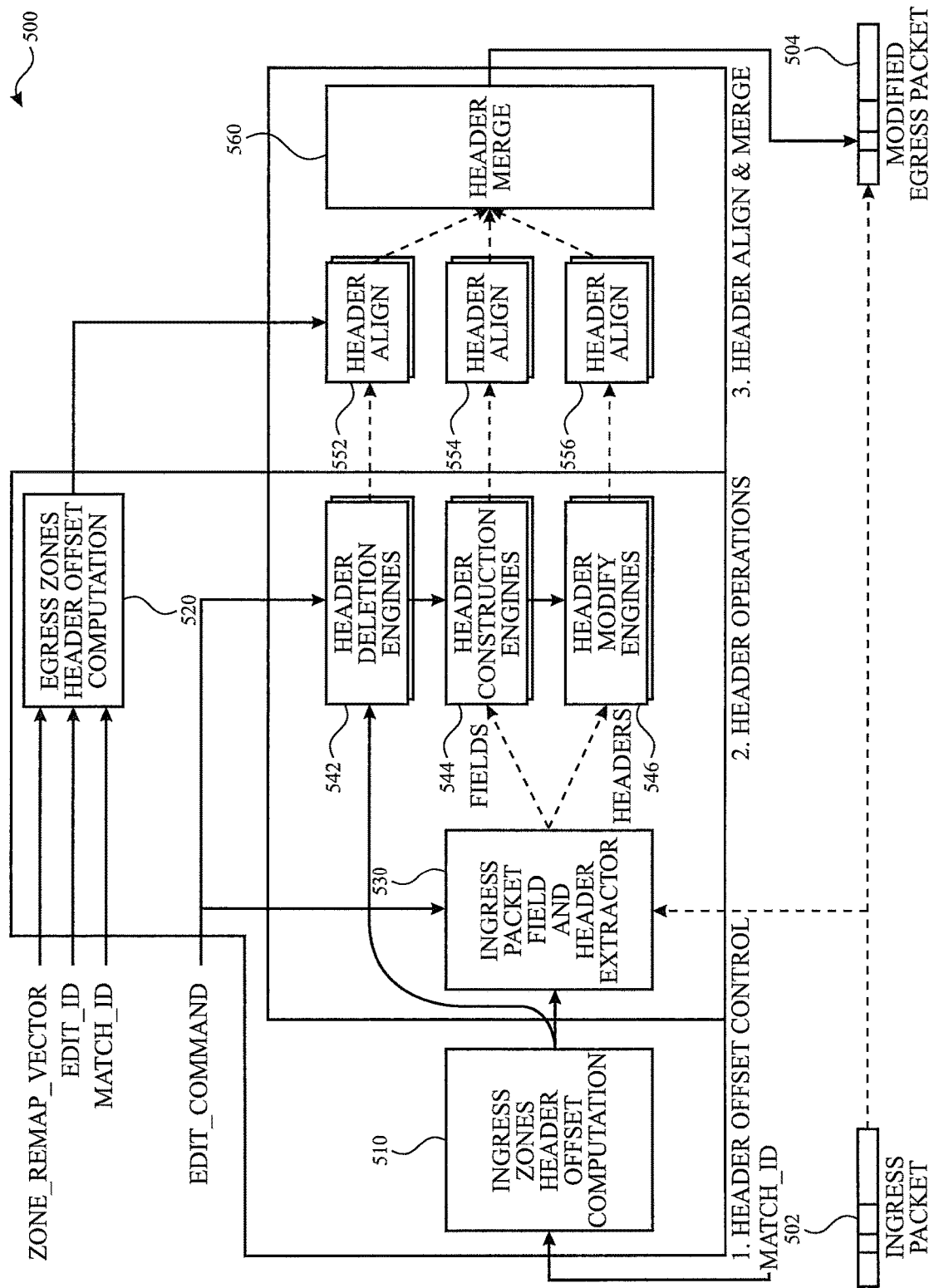
FIG. 5 illustrates a block diagram of an example of a highly parallel packet editing engine in accordance with one or more implementations of the subject technology.

FIG. 5 illustrates a block diagram of an example of a highly parallel packet editing engine 500 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In one or more implementations, the highly parallel packet editing engine 500 includes a framework that partitions the operations of packet editing into three steps: 1) header offset computation, 2) header operations (e.g., create, modify, delete), and 3) align and merge results. As depicted in FIG. 5, the highly parallel packet editing engine 500 includes an ingress header offset computation module 510, an egress header offset computation module 520, a field and header extractor module 530, a header deletion engine 542, a header construction engine 544, a header modify engine 546, header align modules 552, 554, 556 and header merge module 560.

In the step of header offset computation, the subject system computes the offsets for all header operations (additions, deletions, rewrites) ignoring the specific operation on each header (e.g., 510, 520). The task is further divided into computing offsets on existing incoming headers and offsets for new headers added. The headers on a packet are assigned to zones and offset computations for headers within a zone happen in parallel to other zones.

In the step of header operations, the subject system computes header operations, independent of the actual location of the header in the incoming packet (e.g., 542, 544, 546). Each header operation is computed in parallel by independent "editing engines" (e.g., 542, 544, 546). A template of the final header is generated in a separate "scratch memory." In some aspects, the scratch memory is represented as volatile memory.

In the step of align and merge results, the subject system combines the individual headers at the correct offsets to generate the final packet (e.g., 552, 554, 556, 560).

To achieve low latency, steps 1 and 2 are performed in parallel in some implementations, or steps 1, 2 and 3 are further internally parallelized in other implementations.

As used herein, the term "packet header" refers to a contiguous sequence of bytes in the packet. The subject technology places no limitation on the size of a header or its location in the packet, these may be determined by a specific implementation of the process 600 and its configuration. The header is an unit of processing for a process performed by a network device of the subject technology, it may or may not align with the header definitions imposed by networking standards. As an example, a specific implementation may choose to consider 8 bytes associated with two VLAN tags as one header, or a 40 byte IPv6 header as two smaller headers. Headers may be fixed in size or variable. The subject technology imposes no requirement that the headers be fixed in size. Headers are typically added to the beginning of a data packet. When added at the end, the term typically commonly used is "trailer." The subject disclosure uses the term "header" generically for both terms. The subject technology described herein is applicable to both situations, where headers may be placed at the start of a packet or at the end of a packet. Headers are typically not added in the middle of a data payload, but the subject technology can support such application.

As used herein, the term "field" refers to a set of consecutive bits within a header as defined by user programming. The field may be a unit of processing for a process performed by a network device of the subject technology, it may or may not correlate with the field definitions imposed by networking standards.

As used herein, the term "header chaining" refers to headers that are "chained" so an outer header identifies the next inner header(s). This is because multiple headers may be required to carry information required by different layers of the networking stack. For example, a header may contain a "Next Header ID" field that identifies the next header. In another example, a header consisting of a mandatory base header and many optional headers may contain a flags field in the base header that identifies the presence or absence of the optional headers. The field identifying the next header may be located at the start of a header (such as Ethertype) or within the previous header (such as IPv4.Protocol). In some implementations, the editor of the subject technology maintains the consistency of the header chain when headers are added or deleted in the middle of the chain. Adding or deleting one header can have an impact on one or more preceding headers.

As used herein, the term "zone" refers to a grouping of adjacent headers that are closely related to each other, either due to their information content, or their processing needs in the network device. Zone boundaries delineate groups of headers with low affinity to each other. For example, all Layer 2 headers on a packet can be considered as belonging to one zone and Layer 3+Layer 4 headers belong to a second zone. If the Layer 4 headers that a network device processes create many permutations, then they may be assigned to their own distinct zone. A zone is thus not a hard delineation of headers, but rather a processing concept that helps to reduce the header permutations in the network device. In some aspects, zones may not map 1:1 to forwarding layers or protocol suites. The exact mapping of headers to zones may be enabled through programming.

In some implementations, the editor of the subject technology supports editor operations on N zones, where N>=1. In one or more implementations, the convention used in the subject disclosure is that Zone 1 is the outermost zone on a packet and Zone K is the innermost zone of interest, where K>=1. If a specific deployment requires operations on both headers and trailers, then two separate zone spaces may be defined, one for the headers and a separate one for the trailers.

In operation, when a packet arrives a device, the headers present on a packet are identified by a parsing function as belonging to a number of zones. Editor operations are performed by the highly parallel packet editing engine 500 on these zones, which can cause the number of zones to change when the packet is sent out.

In some aspects, zones may be added due to the addition of new headers. In other aspects, zones may be removed (or nullified) if all headers in the zone are completely removed. In some implementations, headers present in one zone in an ingress packet 502 may transition to another zone in the modified egress packet 504. For example, if a network device initiates a "tunnel" or "virtual overlay," the original headers on the packet become the "inner headers" encapsulated inside the new "outer tunnel headers." The newly added tunnel headers would now occupy the outer zone(s) and the previous outer zone shifts inside. There are thus two zone spaces, one for the ingress packet 502 (hereinafter referred to as "the ingress zone space") and one for the modified egress packet 504 (hereinafter referred to as "the egress zone space").

In the highly parallel packet editing engine 500, some editor operations may be defined on ingress zones and some may be defined on egress zones. If an editor implementation supports operations on N distinct zones, the editor operations defined for ingress and egress zones may be mapped to N editor zones. This creates a third zone space, namely an "editor zone space."

The specific processing steps on a packet create a relationship between the ingress zone space and the egress zone space. The subject disclosure uses the term "zone remap vector" to identify this relationship. A representation for the zone space relationship is an array that is indexed by the egress zone providing the corresponding ingress zone. If there is no corresponding ingress zone, then the array returns a reserved NULL value.

In some implementations, the highly parallel packet editing engine 500 obtains information about the structure of the ingress packet 502 in order to operate on it. This packet structure can be determined by one or more parsing engines in the highly parallel packet editing engine 500 (e.g., 530). For the purpose of further discussion, it is assumed that the parsers in an implementation identify and encode this information into a representation called the MATCH_ID. The MATCH_ID identifies the headers on the packet and their order within the packet.

The subject technology imposes no requirements on the encodings used to construct the MATCH_ID. It is assumed that an implementation specific approach is used to construct the MATCH_ID and appropriate mechanisms exist to infer per-zone and per-header information. Since the MATCH_ID covers information for N zones of headers, it can be represented as a N-tuple:

MATCH_ID=<MATCH_ID_ZONE_1, MATCH_ID_ZONE_2, . . . , MATCH_ID_ZONE_$N$>

The MATCH_ID defines the structure of the incoming packet in the ingress zone space. If a packet has variable length headers, then the size of the variable length headers is detected by the parsing engines and encoded in the MATCH_ID.

Referring back to FIG. 3, suppose the processing steps (A1 . . . An) generate editing actions (E1 . . . Em). In this respect, each action Ei would need to describe: 1) the header that is affected by the action, and 2) the operation on the affected header (e.g., edit operations may include Add Header, Delete Header and Modify Header). Referring back to FIG. 5, the highly parallel packet editing engine 500 can further partition the operation into an operation type and an operation command. The operation type may refer to identifying the type of edit operation, such as add header, delete header, and/or modify header. The operation command may refer to instructions that identify specifics of the operation type. For example, the operation command may indicate how to construct a new header and/or how to modify an incoming header. Each action Ei thus contains information that identifies the following: <Header Identifier, Operation Type, Operation Command>.

A key insight of the subject technology is how the highly parallel packet editing engine 500 partitions the editing information. The list of headers to process and the operation types on them are represented by a vector called EDIT_ID. The vector may be expressed as follows:

EDIT_ID=<($H1,OT1$),($H2,OT2$),($H3,OT3$), . . . >

The list of headers to process and the operation commands to apply to them are represented by a vector called EDIT_COMMAND. The vector may be expressed as follows:

EDIT_COMMAND=<($H1,OC1$),($H2,OC2$),
($H3,OC3$), . . . >

In some aspects, no specific encoding is assumed to encode headers, operation types, operation commands, EDIT_ID or EDIT_COMMAND. In one or more implementations, the highly parallel packet editing engine 500 may choose any encoding that is relatively simple to process. The EDIT_ID and EDIT_COMMAND may both define actions in the editor zone space.

As with MATCH_ID, the editing information is per-zone and can be viewed as an N-Tuple, which are expressed as follows:

EDIT_ID=<EDIT_ID_ZONE_1, . . . ,
EDIT_ID_ZONE_$N$>

EDIT_COMMAND=<EDIT_COMMAND_
ZONE_1, . . . , EDIT_COMMAND_ZONE_$N$>

In some implementations, there are two key concepts that enable parallelization of editing actions that lead to low latency: 1) partitioning of editing actions, and 2) the concept of zones. In the partitioning of editing actions, the EDIT_ID and EDIT_COMMAND vectors enable header offset calculation and header editing operations to be independent of each other. Information provided by the EDIT_ID vector may be sufficient to calculate egress header offsets. Offset calculation may not need to know the specifics of the edit operation being performed on a header. Information provided by the EDIT_COMMAND vector may be sufficient to perform header specific operations. These operations may not need the offset information.

The concept of zones helps to reduce the number of header permutations. If a network device needs to deal with H different header types, then the theoretical permutation of headers may be (H!). Although this permutation value may rapidly increase to a large number, each zone may only contain a small subset of headers, leading to a much smaller number of permutations per zone. This enables per-zone offset calculations to be implemented using fast lookup tables instead of being computed serially. In some implementations, zone relative offsets across different zones can be computed in parallel.

As depicted in FIG. 5, the highly parallel packet editing engine 500 receives the following inputs to perform the highly parallel packet editing operations: 1) MATCH_ID vector, 2) EDIT_ID vector, 3) EDIT_COMMAND vector, and 4) ZONE_REMAP_VECTOR. The MATCH_ID vector provides information to compute the ingress headers offsets. The EDIT_ID vector provides information to compute the egress header offsets. The EDIT_COMMAND vector provides information to compute the operation on different headers. For header modify operations, the EDIT_COMMAND vector indicates which fields to modify in a header and how to obtain the data. For header construction operations, the EDIT_COMMAND vector indicates how to construct the new header. For header delete operations, no additional information is required other than the header identification. The ZONE_REMAP_VECTOR identifies the relationship between the ingress zone space and the egress zone space.

In one or more implementations, the header offset control function, performed by the ingress header offset computation module 510 and the egress header offset computation module 520, is responsible for computing the offsets for headers in the incoming packet as well as the outgoing packet, respectively. The zone concept allows both ingress and egress offsets to be computed using reasonable sized lookup tables (not shown). If there are "k" unique header types in a zone, their real world permutations are much less than the theoretical max (k!). Similarly, the number of (MATCH_ID×EDIT_ID) permutations is often a sparse matrix depending on the flows supported in a network device. Lookup tables can be implemented using hash tables, index tables or TCAMs depending on the encodings used for MATCH_ID and EDIT_ID vectors.

The ingress header offset computation module 510 receives the MATCH_ID vector. The offsets for incoming headers are a function of the MATCH_ID vector and derived using lookup tables. To support edit operations on N zones, a network device implements N lookup tables. The offset vector produced by the ingress header offset computation module 510 may be expressed as follows:

INGRESS_OFFSET_LOOKUP_ZONE_$i$
[MATCH_ID_$i$]→<($H1,H1\_SIZE$,
$H1\_OFFSET$),($H2,H2\_SIZE$,
$H2\_OFFSET$), . . . , SIZE_ZONE_$i$>

Each lookup table also provides the total size of the zone in bytes. The absolute offsets are computed in real time by adding the size of previous zones.

$Hx$_ABSOLUTE_OFFSET=
SIZE_ZONE_1+ . . . +SIZE_ZONE_
$k$−1+$Hx$_OFFSET

The egress header offset computation module 520 receives the MATCH_ID, EDIT_ID, EDIT_COMMAND and ZONE_REMAP_VECTOR vectors. The offsets for outgoing headers are a function of (MATCH_ID×EDIT_ID). They are also derived using per-zone lookup tables and the absolute offsets are computed in real time similar to the ingress offsets. The offset vector produced by the egress header offset computation module 520 may be expressed as follows:

EGRESS_OFFSET_LOOKUP_ZONE_$i$
[MATCH_ID_$i$, EDIT_ID_$i$]→<($H1, H1\_SIZE$,
$H1\_OFFSET$), . . . , SIZE_ZONE_$i$>

Each lookup table also provides the total size of the zone in bytes. The absolute offsets are computed in real time by adding the size of previous zones. For example, for header Hx in Zone k, the absolute offset may be expressed as follows:

$$Hx\_ABSOLUTE\_OFFSET = SIZE\_ZONE\_1 + \ldots + SIZE\_ZONE\_k-1 + Hx\_OFFSET$$

In some implementations, the egress offset computation (e.g., 520) occurs after the ingress offset computation (e.g., 510) and in parallel with the header construction operations (e.g., 544). The results may only be required in the final "merge and align" step performed respectively by the header align modules 552, 554, 556 and the header merge module 560.

In one or more implementations, the header operation functions are performed by respective editor engines of the highly parallel packet editing engine 500. In some implementations, there are three (3) primary types of editor operations—header addition, header deletion and in-place header editing. These operation types may be supplemented by other specialized operations such as checksum updates that cross header boundaries.

Functionally, each operation type may be performed by a separate "engine type" (e.g., the header deletion engine 542, the header construction engine 544, the header modify engine 546). The number of engines and their capabilities may vary across implementations. The editor engines may be heterogenous in their capabilities. To initiate header specific operations, two inputs are needed by each of the editor engines: 1) the ingress offsets of each headers, and 2) per-header commands (e.g., add, delete, modify) encoded in the EDIT_COMMAND vector.

In some implementations, the header addition operations can be initiated as soon as the processing steps infer a header that needs to be constructed. The fields to construct the header may be derived from an incoming header, table lookups and non-mutable fields that are constants.

The header construction engine 544 may not need to know where the header will be located in the modified egress packet 504 relative to other headers and the header construction operations can be triggered in a non-critical timing path. The header addition operations affect the offsets of subsequent headers and this offset is known a priori.

In some implementations, the header deletion operations performed by the header deletion engine 542 may only need to identify the header offset and bytes that are to be deleted and are not dependent on any other editor operations. The offset for the header deletion operation may be available from the MATCH_ID vector. In some aspects, the header deletion engines 542 may be configured to zero out space in the incoming packet that negatively offsets the locations of any subsequent headers.

In one or more implementations, the in-place editing operations may require the ingress offset of a header and fields generated by processing actions. They do not affect the egress offset of any subsequent headers. To modify an existing header with an in-place editing operation, the EDIT_COMMAND vector may encode information on the modifications required by a specific header.

In some implementations, the header align and merge functions may combine the results of various independent header editing operations. These functions may depend on possessing information on the offset for each header in the outgoing modified egress packet 504, which is computed by logic of the egress header offset computation module 520. The result of each editor engine is shifted into place, and in parallel, in the outgoing packet buffer.

Figure 6:
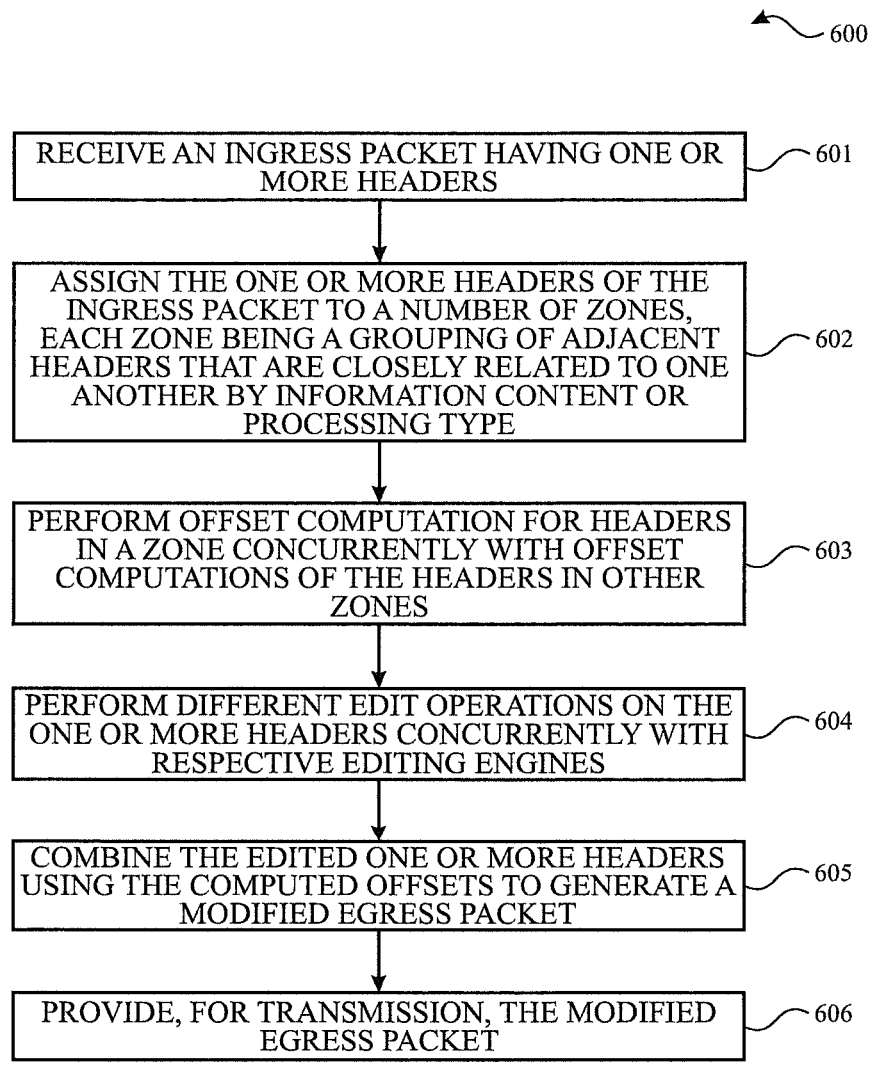
FIG. 6 illustrates a process of executing a switching decision behavior in a network device with a highly parallel programmable packet editing engine and a scalable control infrastructure in accordance with one or more implementations of the subject technology.

FIG. 6 illustrates a process 600 of executing a switching decision behavior in a network device with a highly parallel programmable packet editing engine and a scalable control infrastructure in accordance with one or more implementations of the subject technology. For explanatory purposes, the example process 600 is primarily described herein with reference to the highly parallel packet editing engine 500 of FIG. 5; however, the example processes 600 is not limited to the highly parallel packet editing engine 500 of FIG. 5, and one or more blocks (or operations) of the process 600 may be performed by one or more other components or circuits of the highly parallel packet editing engine 500, such as the ingress header offset computation module 510, the egress header offset computation module 520, the header editing engines 542, 544, 546, and header align modules 552, 554, 556 and merge module 560. Further for explanatory purposes, the blocks of the example process 600 are described herein as occurring in serial, or linearly. However, multiple blocks of the example process 600 can occur in parallel. In addition, the blocks of the example process 600 can be performed in a different order than the order shown and/or one or more of the blocks of the example process 600 are not performed.

The process 600 begins at step 601, where the highly parallel packet editing engine 500 receives an ingress packet having one or more headers. Next, at step 602, the highly parallel packet editing engine 500 assigns the one or more headers of the ingress packet to a number of zones. In some aspects, each zone is a grouping of adjacent headers that are closely related to one another by information content or processing type. Subsequently, at step 603, the highly parallel packet editing engine 500 performs offset computations for headers in a zone that occur concurrently with offset computations of headers assigned to other zones. Next, at step 604, the highly parallel packet editing engine 500 performs different edit operations on the one or more headers that occur concurrently using respective editing engines. Subsequently, at step 605, the highly parallel packet editing engine 500 combines the edited one or more headers using the computed offsets to generate a modified egress packet. Next, at step 606, the highly parallel packet editing engine 500 provides, for transmission, the modified egress packet.

Header offset computation in a programmable, low latency editor poses two types of multiplicative scalability challenges: 1) Number of possible offset computation cases that need to be handed in a given zone is of the order of (MATCH_ID*EDIT_ID) for that zone (i.e. the product of the number of possible MATCH_ID encodings, and the number of possible EDIT_ID encodings), and 2) the number of possible EDIT_ID vector variations for a zone is of the order of (EDIT_ID_DELETE*EDIT_ID_REWRITE*EDIT_ID_INSERT), where: a) the EDIT_ID_DELETE vector represents the number of possible combination of headers (or subsets thereof) to be deleted in a given zone, b) the EDIT_ID_REWRITE vector represents the number of possible combination of headers (or subsets thereof) to be rewritten in a given zone, and c) the EDIT_ID_INSERT vector represents the number of possible combination of headers (or subsets thereof) to be inserted in a given zone. The scalability challenges can be illustrated with a simple scheme to implement the offset computations for a given zone, which is referred to as the "M×E Scheme" and illustrated in FIG. 7.

Figure 7:
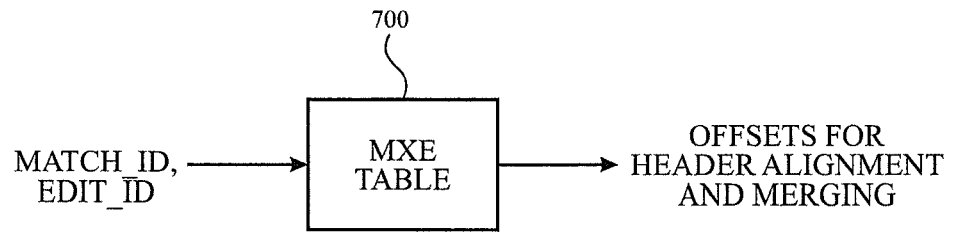
FIG. 7 conceptually illustrates an example of a first scheme implementing offset computations for a given zone.

FIG. 7 conceptually illustrates an example of a first scheme implementing offset computations for a given zone. The M×E scheme may use a single associative table (e.g., M×E Table 700) that is looked up using the {MATCH_ID, EDIT_ID} vectors and provides all the header offsets for the zone. The scale of the M×E table 700 needs to be sufficient to accommodate all possible (MATCH_ID*EDIT_ID) variations for that zone. This approach becomes expensive in area and impractical as the number of headers in a zone increases.

Figure 8:
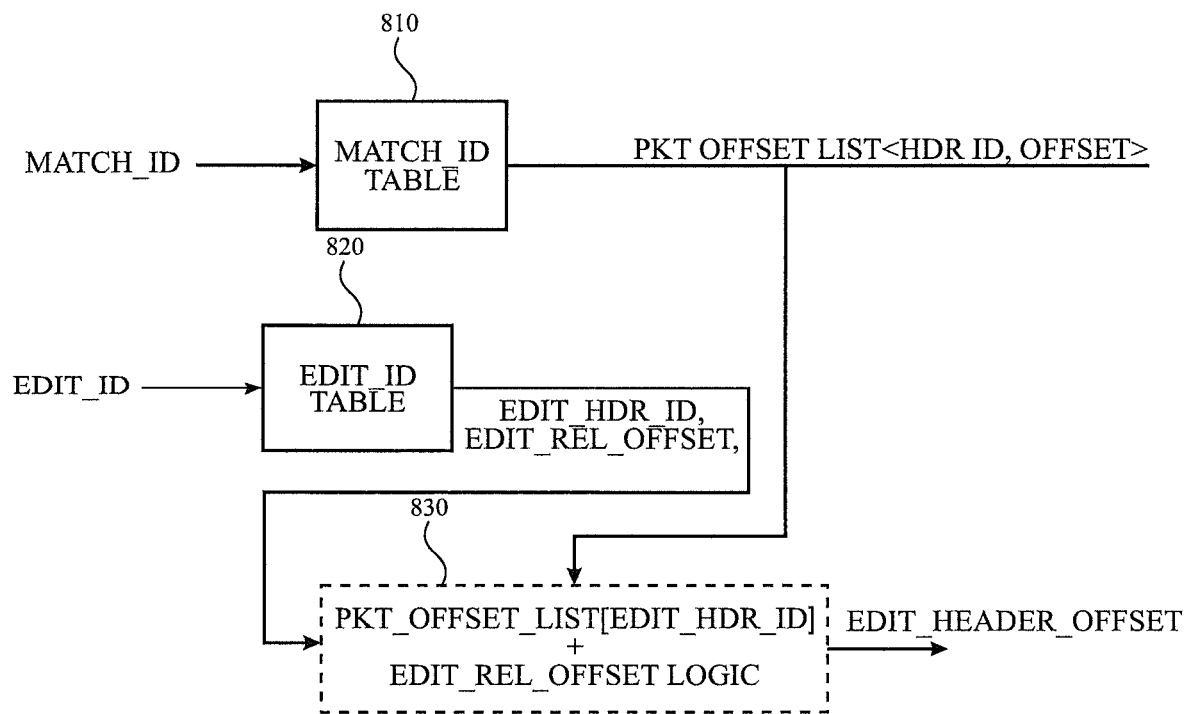
FIG. 8 conceptually illustrates an example of a second scheme implementing offset computations for a given zone in accordance with one or more implementations of the subject technology.

FIG. 8 conceptually illustrates an example of a second scheme 800 implementing offset computations for a given zone in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As depicted in FIG. 8, the second scheme 800 is hereinafter referred to as the "M+E scheme," which avoids the multiplicative scale issues of the M×E scheme by separating the MATCH_ID vector and EDIT_ID vector information into separate tables. The information is encoded in these two separate tables in a specific manner so that simple post-processing logic can derive the final desired header offsets. The second scheme 800 includes a MATCH_ID table 810, an EDIT_ID table 820 and processing logic 830.

The MATCH_ID table 810 provides an ordered list of headers and their offsets in the incoming packet (e.g., Pkt_offset_list). The list may consist of an ordered set of <hrd_id, offset> tuples, where "Hdr_id" is an internally assigned identifier that identifies each type of header possible in the zone, and "Offset" is the start location of the header in the zone.

The EDIT_ID table 820 provides a set of edit instructions, each of which specifies an edit_hdr_id (hdr_id on which the instruction operates). The signal "Edit_rel_offset" allows the operation to be specified at a relative offset to the start location of the hdr_id. The processing logic 830 computes the edit_header_offset by combining information from both tables (e.g., 810, 820).

Figure 9:
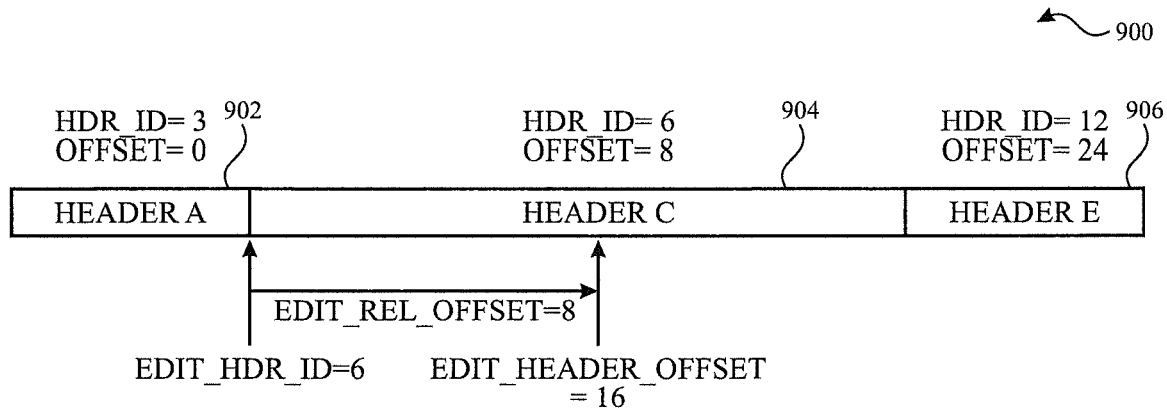
FIG. 9 conceptually illustrates an example of a packet format of an incoming packet having multiple headers using the M+E scheme in accordance with one or more implementations of the subject technology.

FIG. 9 conceptually illustrates an example of a packet format of an incoming packet 900 having multiple headers using the M+E scheme in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The M+E scheme is illustrated from a packet perspective with an example of a rewrite operation on a Header C (e.g., 904). The incoming packet 900 has three headers in a zone. Headers A (e.g., 902), C (e.g., 904) and E (e.g., 906), for which MATCH_ID table 810 provides hdr_id values 3, 6 and 12, respectively, along with offsets 0, 8, 24 bytes, respectively. In some aspects, the EDIT_ID table 820 specifies edit_hdr_id=6, which corresponds to Header C (e.g., 904). It also specifies a relative offset of 8 bytes from the start of Header C (e.g., 904). The M+E processing logic 830 combines this information to compute a header offset (e.g., edit_header_offset=16 bytes). The M+E scheme illustrated in FIG. 9 is scalable because information in the MATCH_ID table 810 is independent of the types of edit operations, while information in the EDIT_ID table 820 is independent of possible header combinations. In some implementations, the same EDIT_ID vector information would apply to a packet having additional headers, namely Headers A, B, C and D.

In some implementations, header insert operations may require some additional handling in the M+E scheme due to the fact that the edit_hdr_id specified for such an operation may not typically be present in the Pkt_offset_list provided by the MATCH_ID table 810. In this respect, the header insert operations may involve insertion of headers not already present in the incoming packet. In some aspects, networking standards typically define ordering requirements for various possible headers in a given packet (e.g., a UDP header should always occur after an IPv4 header). Hence, for header insert operations, the offset at which a given header is to be inserted is a function of all the other headers present in the incoming packet.

Figure 10:
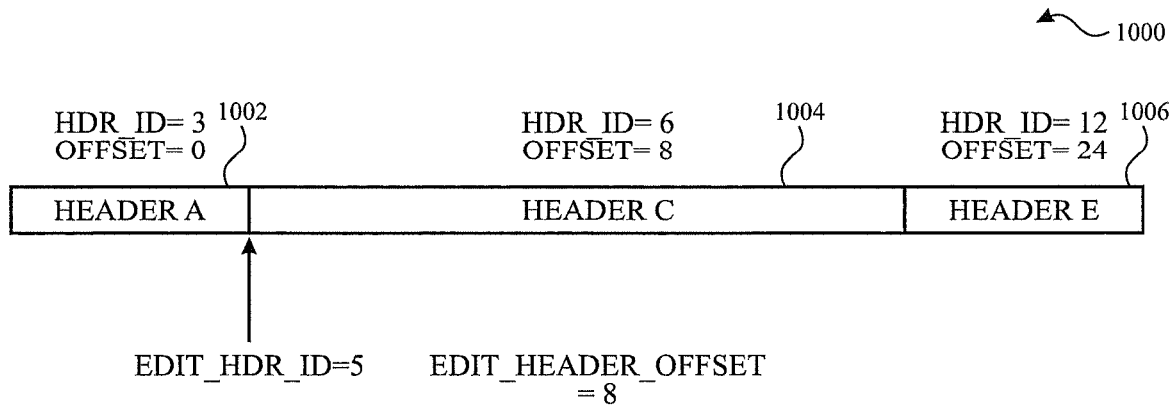
FIG. 10 illustrates an example of a header insertion operation in accordance with one or more implementations of the subject technology.

In one or more implementations, the M+E scheme is able to address the header insertion case while maintaining the core scalability objective of separating information related to incoming packets and edit operations. This may be achieved by a process referred to as "ordered Insertion" further described in FIG. 10. The ordered insertion scheme may allow MATCH_ID and EDIT_ID vector information to be scalable and separate even for header insert operations. The central concept of the ordered insertion scheme is the manner in which hdr_id values are assigned to headers in a zone. In some implementations, the hdr_id values are assigned in ascending order based on an allowed precedence order of headers in the zone, per applicable networking standards. For example, if HEADER_A (e.g., 1002) precedes HEADER_B, then the hdr_id value for HEADER_A is assigned to be less than the hdr_id value for HEADER_B. The ordered assignment of hdr_id values allows the M+E processing logic to perform a simple arithmetic compare operation to determine the location of a header insert operation in a given incoming packet. In one or more implementations, the insert location is determined by comparing edit_hdr_id with each of the hdr_id values of the headers (e.g., 1002, 1004, 1006) for the incoming packet 1000. It may be computed as the location of the first hdr_id that is greater than edit_hdr_id. FIG. 10 illustrates an example of a header insertion operation of HEADER_B (edit_hdr_id=5).

Each header in a zone could have up to three types of operations associated with it—Delete, Insert, Rewrite. Hence, the total number of possible edit operations in a zone grows multiplicatively based at least on the product of the number of possible operations of each type, e.g., (EDIT_ID_DELETE*EDIT_ID_INSERT*EDIT_ID_REWRITE).

Figure 11:
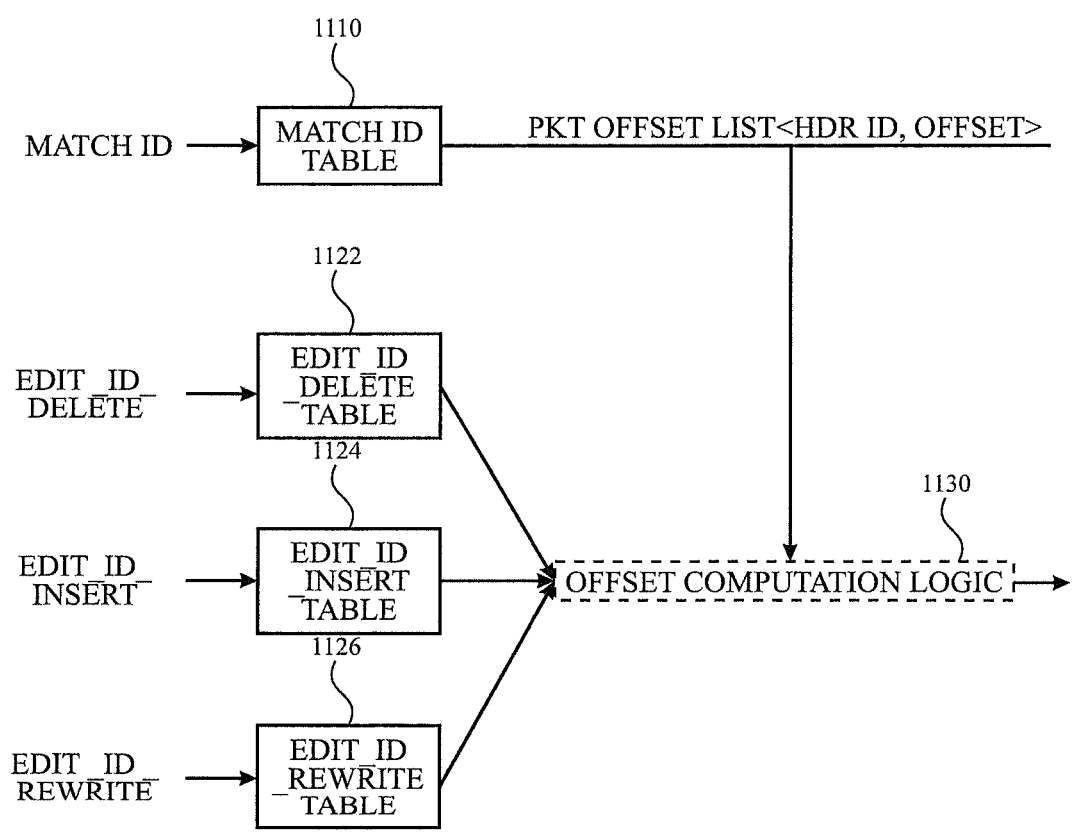
FIG. 11 conceptually illustrates how the M+E Scheme can be enhanced to address an editor operation scalability challenge in accordance with one or more implementations of the subject technology.

FIG. 11 conceptually illustrates a third scheme 1100 on how the M+E Scheme can be enhanced to address the EDIT_ID scalability challenge. The third scheme 1100 includes a MATCH_ID table 1110, EDIT_ID tables 1122, 1124, 1126 and processing logic 1130. Instead of a single EDIT_ID table (as shown in FIG. 8), there are three tables (e.g., 1122, 1124, 1126), one for each type of edit operation. As described in FIG. 5, the editor has separate editor engines for each type of edit operation. Hence, partitioning the EDIT_ID information as depicted in FIG. 11 makes the M+E scheme more scalable without any loss of programmability.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of packet processing, the method comprising:
   processing a received ingress packet having one or more headers;
   assigning, by one or more processors, the one or more headers of the received ingress packet to a number of zones, wherein each zone is a grouping of adjacent headers that are closely related to one another by information content or processing type;
   performing, by the one or more processors, offset computations for the one or more headers in a zone concurrently with offset computations of headers assigned to other zones;
   performing, by the one or more processors, different header operations on the one or more headers concurrently with respective ones of a plurality of editing engines to produce edited one or more headers;
   combining, by the one or more processors, the edited one or more headers at the computed offsets to generate a modified egress packet; and
   providing, for transmission, the modified egress packet.

2. The method of claim 1, wherein assigning the one or more headers comprises assigning one or more headers of the received ingress packet to one or more ingress zones and one or more headers of the processed packet to one or more egress zones.

3. The method of claim 1, wherein performing the offset computations comprises performing ingress header offset computations concurrently with or subsequent to egress header offset computations.

4. The method of claim 3, wherein performing the offset computations comprises performing the egress header offset computations concurrently with performing one or more of header construction operations or header modification operations.

5. The method of claim 1, wherein performing the offset computations comprises computing an offset for each of a plurality of header operations irrespective of a specific header operation on each header.

6. The method of claim 1, wherein performing the offset computations comprises computing an offset for each header of the received ingress packet.

7. The method of claim 1, wherein performing the offset computations comprises computing an offset for each header added to the modified egress packet.

8. The method of claim 1, wherein performing the offset computations comprises calculating the offsets per zone using one or more lookup tables associated with the zone.

9. The method of claim 1, wherein performing the different header operations comprises performing one or more header operations independent of an actual location of a header in the received ingress packet.

10. The method of claim 1, wherein performing the different header operations comprises performing each different header operation in parallel by independent editing engines of the plurality of editing engines.

11. The method of claim 1, wherein the offset computations and the header operations are performed in parallel.

12. The method of claim 1, wherein the combining the edited one or more headers of the received ingress packet at the computed offsets is based on information indicating an offset for each header in the modified egress packet.

13. The method of claim 1, wherein the combining the edited one or more headers comprises shifting a result of each editor engine in parallel into an outgoing packet buffer, and wherein the modified egress packet is fed from the outgoing packet buffer.

14. The method of claim 1, wherein the combining the edited one or more headers comprises performing header merge operations in parallel to the offset computations and the header operations.

15. A device comprising:
    a processor; and
    a memory device containing instructions, which when executed by the processor cause the processor to perform operations comprising:
    processing a received ingress packet;
    parsing the received ingress packet to identify one or more headers in the received ingress packet;
    assigning the one or more headers of the received ingress packet to a number of zones, wherein each zone is a grouping of adjacent headers that are closely related to one another by information content or processing type;
    performing offset computations for the one or more headers in a zone concurrently with offset computations of headers assigned to other zones;
    performing different header operations on the one or more headers concurrently with respective ones of a plurality of editing engines to produce edited one or more headers;
    combining the edited one or more headers at the computed offsets to generate a modified egress packet; and
    providing, for transmission, the modified egress packet.

16. The device of claim 15, wherein the plurality of editing engines comprises a header construction engine, a header deletion engine, and a header modify engine.

17. The device of claim 16, wherein the performing offset computations comprises performing an ingress header offset computation, and wherein the operations further comprise:
    extracting one or more fields and extracting one or more headers, from the ingress header offset computation.

18. The device of claim 17, wherein the operations further comprise:
sending the extracted one or more fields to the header construction engine.

19. The device of claim 17, wherein the operations further comprise:
sending the extracted one or more headers to the header modify engine.

20. The device of claim 17, wherein the performing different header operations comprises performing a header deletion operation with the header deletion engine using the ingress header offset computation.

21. A non-transitory computer-readable medium comprising instructions executable by one or more processors, the instructions comprising:
instructions for receiving an ingress packet having one or more headers;
instructions for assigning the one or more headers of the ingress packet to a number of zones, wherein each zone is a grouping of adjacent headers that are closely related to one another by information content or processing type;
instructions for performing offset computations for the one or more headers in a zone concurrently with offset computations of headers assigned to other zones;
instructions for performing different edit operations on the one or more headers concurrently with respective ones of a plurality of editing engines to produce edited one or more headers;
instructions for combining the edited one or more headers using the computed offsets to generate a modified egress packet; and
instructions for providing, for transmission, the modified egress packet.

22. The non-transitory computer-readable medium of claim 21, wherein the instructions further comprise:
instructions for parsing the ingress packet to identify one or more headers in the ingress packet; and
instructions for determining that the identified one or more headers correspond to a number of zones.

23. The non-transitory computer-readable medium of claim 22, wherein the number of zones comprises a first zone that corresponds to an outermost zone on a packet and a second zone that corresponds to an innermost zone of the packet.

24. The non-transitory computer-readable medium of claim 22, wherein a header of the one or more headers is assigned to a first zone for the ingress packet and the header is assigned to a second zone different from the first zone for the modified egress packet.

25. The non-transitory computer-readable medium of claim 21, wherein the instructions further comprise:
instructions for creating a relationship between an ingress zone space and an egress zone space by an array that is indexed by an egress zone providing a corresponding ingress zone.

26. The non-transitory computer-readable medium of claim 21, wherein a boundary between adjacent zones delineate groups of headers having a level of affinity below a threshold, to each other.

27. The non-transitory computer-readable medium of claim 21, wherein the instructions further comprise:
instructions for obtaining information about a structure of the ingress packet,
wherein the information indicates a number of headers in the ingress packet and a number of corresponding zones.

28. The non-transitory computer-readable medium of claim 27, wherein the instructions further comprise:
instructions for encoding the information of the structure into a match identifier vector,
wherein the match identifier vector identifies the number of headers in the ingress packet and corresponding order within the ingress packet.

29. The non-transitory computer-readable medium of claim 28, wherein the match identifier vector defines a structure of the ingress packet in an ingress zone space.

30. The non-transitory computer-readable medium of claim 28, wherein the match identifier vector comprises information for N zones of headers, where N is an integer.

31. The non-transitory computer-readable medium of claim 28, wherein calculated offsets for the ingress packet are a function of the match identifier vector and derived using one or more lookup tables.

32. The non-transitory computer-readable medium of claim 21, wherein each zone comprises a subset of the headers from the ingress packet, and wherein the subset of the headers corresponds to a subset of a maximum number of permutations per zone.

33. The non-transitory computer-readable medium of claim 21, wherein the instructions further comprise:
instructions for performing each of the different edit operations by an operation type and an operation command,
wherein the operation type identifies a type of edit operation and the operation command includes instructions that identify specific information about the operation type, and
wherein the type of edit operation corresponds to one or more of an add header operation, a delete header operation or a modify header operation.

34. The non-transitory computer-readable medium of claim 21, wherein the instructions further comprise:
instructions for processing an edit identifier vector that indicates a list of headers with corresponding operation types to process; and
instructions for processing an edit command vector that indicates the list of headers to process and corresponding operation commands that apply to the headers.

* * * * *

UNITED STATES PATENT AND TRADEMARK OFFICE
CERTIFICATE OF CORRECTION

PATENT NO. : 10,855,816 B2
APPLICATION NO. : 16/418869
DATED : December 1, 2020
INVENTOR(S) : Rajan Sharma et al.

Page 1 of 1

It is certified that error appears in the above-identified patent and that said Letters Patent is hereby corrected as shown below:

On the Title Page

The Inventor information should read as follows:
(72) Inventors: Rajan SHARMA, San Jose, CA (US);
Niranjan Vaidya, San Jose, CA (US);
Mandar Joshi, San Jose, CA (US);
Chi Ho Fredrek CHOI, San Jose, CA (US)

Signed and Sealed this
Twenty-sixth Day of December, 2023

Katherine Kelly Vidal
*Director of the United States Patent and Trademark Office*